E. C. SHORT.

SUPPORT FOR POLE CROSS ARMS.

APPLICATION FILED JUNE 13, 1906.

12,878. Reissued Nov. 10, 1908.

Witnesses

D. W. Edelin.

James H. Marr.

Inventor

Edward C. Short by Edward E. Clement

Attorneys

THE NORRIS PETERS CO., WASHINGTON, D. C.

UNITED STATES PATENT OFFICE.

EDWARD C. SHORT, OF ST. PAUL, MINNESOTA, ASSIGNOR, BY MESNE ASSIGNMENTS, TO STEEL GAIN MANUFACTURING COMPANY, OF CHICAGO, ILLINOIS, A CORPORATION OF ILLINOIS.

SUPPORT FOR POLE CROSS-ARMS.

No. 12,878. Specification of Reissued Letters Patent. Reissued Nov. 10, 1908.

Original No. 804,630, dated November 14, 1905, Serial No. 257,562. Application for reissue filed June 13, 1906. Serial No. 321,576.

*To all whom it may concern:*

Be it known that I, EDWARD C. SHORT, a citizen of the United States, and a resident of St. Paul, in the county of Ramsey and State of Minnesota, have invented a certain new and useful Improvement in Supports for Pole Cross-Arms, of which the following is a specification.

My invention relates to devices for attaching cross-arms to posts and poles; and its chief object is to provide a convenient and serviceable device for supporting the cross-arms on telegraph and telephone poles.

Stated in a general way, the device comprises a pair of plates which engage the pole and cross-arm and a bolt for holding the parts together.

My improvements are illustrated in the accompanying drawings, in which—

Figure 1:
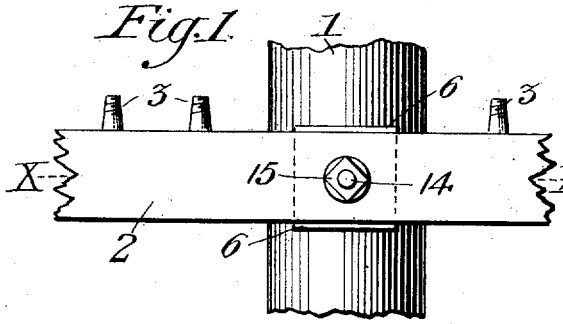
Figure 2:
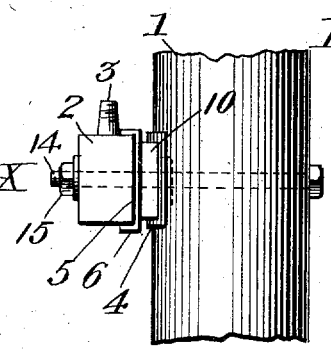
Figure 4:
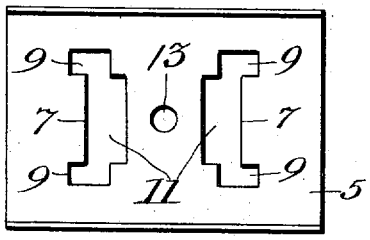
Figure 3:
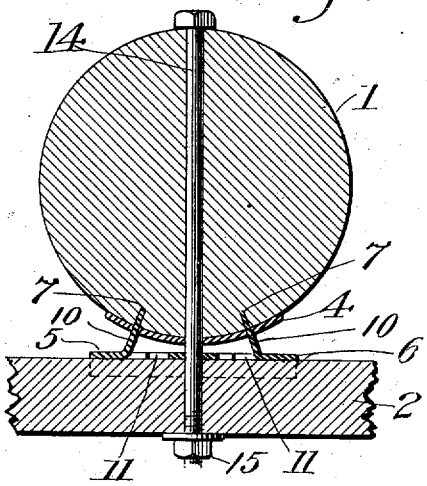
Figure 5:
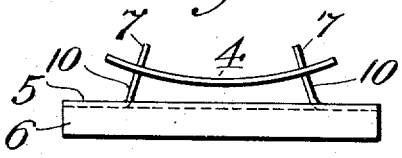
Figure 6:
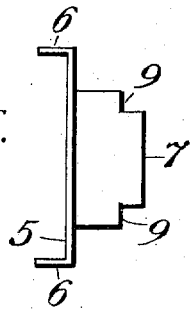
Figure 7:
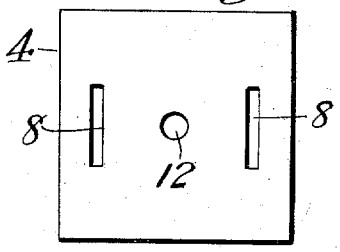

Figure 1 shows in front elevation a post and a cross-arm supported thereon by the devices of my improvement. Fig. 2 is a side elevation of the same. Fig. 3 is a horizontal sectional view on the line *x x* of Fig. 1. Figs. 4, 5, and 6 are respectively front, top, and end views of the outer plate detached; and Fig. 7 is a face view of the inner plate detached.

In the drawings, 1 designates a portion of a wooden post or pole, and 2 a cross-arm having pins 3 for holding insulators for telephone-wires or other conducting-wires. Ordinarily the cross-arms are attached to such posts by seating them in gains or mortises cut in the posts and securing them in place by bolts. There are a number of objections to that mode of attaching the arms which are avoided by my improvement.

I provide a curved inner or post plate 4, which bears against the post, and being made of sheet-steel is capable of being bent to conform substantially to the shape of the adjacent portion of the post.

An outer or cross-arm plate 5 is provided with outward flanges 6 along its upper and lower edges to form a socket to receive the cross-arm and prevent it from tilting. This plate is also preferably made of sheet-steel, so that it can be shaped by dies.

At opposite sides of its middle are inward tongues 7, extending nearly at right angles from the body of the plate, and the post-plate 4 is provided with slots 8, through which the tongues 7 pass to contact with the post. The extent to which the tongues may penetrate the post is limited by contact of the shoulders or offsets 9 of the wider or base portions 10 of the tongues with the surface of the post-plate. The bearing of these shoulders on the inner plate and the comparatively close fit of the upper and lower edges of the tongues 7 in the slots 8 aid in keeping the two plates firmly together to hold the cross-arm in proper horizontal position. The openings left in the plate 5 by the forming and bending inward of the tongues are indicated at 11.

Holes 12 and 13 are made in the centers of the two plates for the passage of a bolt, and a bolt 14 is passed through the post and the plates and the cross-arm. A nut 15 enables the parts to be drawn firmly together, the tongues 7 pressed into the post and the inner plate bent to conform approximately to the curve of the post.

Having described my invention, what I claim, and desire to secure by Letters Patent, is—

1. A cross-arm support, comprising a post-plate, a cross-arm plate, tongues on the latter extending through slots in the former to contact with the post, a bolt for clamping such plates between a cross-arm and a post, substantially as set forth.

2. A cross-arm support, comprising a post-plate, a cross-arm plate, tongues on the latter extending through slots in the former to contact with the post, means for limiting the extent of the tongue movements through said slots, and a bolt for clamping such plates between a cross-arm and a post, substantially as set forth.

3. A cross-arm support, comprising a curved post-plate, a cross-arm plate having upper and lower flanges, tongues on the latter extending through slots in the former to contact with the post, and a bolt for clamping such plates between a cross-arm and a post, substantially as set forth.

4. A cross-arm support, comprising a curved post-plate, a cross-arm plate having upper and lower flanges, tongues on the latter extending through slots in the former to contact with the post, means for limiting the extent of the tongue movements through said slots, and a bolt for clamping such plates between a cross-arm and a post, substantially as set forth.

5. The combination with a post and cross-arm, of a pair of plates consisting of a curved plate in contact with the post, an outer plate in contact with the cross-arm and having tongues extending through the curved plate into the post, and a bolt for clamping such plates between the post and cross-arm, substantially as set forth.

6. In a cross-arm support, a sheet metal plate having forwardly projecting flanges for engaging a cross-arm and rearwardly projecting flanges for engaging a pole to which the cross-arm is to be attached, said flanges and tongues being struck up from the metal of said plate; a member alined on the pole and engaged by the plate and means for clamping the cross-arm, said member and said plate to the pole.

7. In a cross-arm support, a sheet metal plate having forwardly projecting flanges for engaging a cross-arm and rearwardly projecting tongues for engaging a pole to which the cross-arm is to be attached, said flanges and tongues being struck up from the metal of said plate, a pole plate having orifices for said tongues, and a bolt adapted to extend through the cross-arm and said plates to bind them in position on the pole.

8. A cross-arm support comprising a post plate and a cross-arm plate with rearwardly projecting tongues on the cross-arm plate adapted to extend back of the post plate into a post, and to bind said post plate against the post.

9. A cross-arm support comprising a post plate and a cross-arm plate, rearwardly projecting tongues on the cross-arm plate adapted to extend back of the post plate into a post, and to bind said post plate against the post, and a bolt for clamping such plates between a cross-arm and said post.

10. A cross-arm support for posts comprising a post plate, a cross-arm plate, tongues on the latter adapted to coöperate with the former to shape it to the post, and means for clamping both plates between a cross-arm and the post.

11. A cross-arm support for posts comprising a post plate, a cross arm plate, tongues on the latter adapted to engage the former to shape it to the post, said tongues also engaging the post, and means for clamping the plates between a cross-arm and the post.

12. A cross-arm support for posts comprising a post plate, a cross-arm plate, tongues on the latter coöperating with the former and with the post to shape the post plate to the post, means for limiting the extent of engagement of said tongues with the post, and a clamping device adapted to clamp both of said plates between a cross-arm and the post.

13. A cross-arm support for posts, comprising a post plate, a cross-arm plate having upper and lower flanges, rearwardly extending tongues upon the cross-arm plate adapted to coöperate with the post plate to shape it to the post, and a device for holding a cross-arm between the flanges of the cross-arm plate and for clamping the same to the post.

14. A cross-arm support for posts comprising a post plate, a cross-arm plate having upper and lower flanges, rearwardly extending tongues upon the cross-arm plate adapted to coöperate with the post plate to shape it to the post, shoulders on said tongues for engagement with the post plate to limit the extent of engagement of the post by the tongues and a bolt passing through the cross arm and said plates and also through the post whereby the plates are clamped between the cross-arm and the post.

15. The combination of a pole and a cross-arm with an interposed member embracing the pole and a second interposed member engaging the cross-arm, with means for engaging said members together, thereby holding the embracing member on the pole and maintaining the cross-arm at right angles thereto.

16. The combination of a pole and a cross-arm, with an interposed member embracing and holding the cross-arm, and provided with projections adapted to enter the pole, and a central through bolt for clamping the cross-arm and said interposed member to the pole.

17. The combination of a pole and a cross-arm with an interposed member having a horizontal channel-way to receive the cross-arm, and projecting vertical flanges to engage and enter the pole, and a central through bolt for clamping the cross-arm and the interposed member to the pole.

18. The combination of a pole and a cross-arm, with an interposed artificial gain or support comprising a sheet metal body with forwardly projecting flanges to receive the cross-arm, and rearwardly projecting members to engage the pole, and a central through bolt clamping the parts together and forcing said projecting members into the pole, whereby the cross-arm is firmly held and prevented from turning thereon.

19. The combination of a pole and a cross-arm, with an interposed artificial gain or support comprising a sheet metal body having forwardly and rearwardly projecting flanges struck up therefrom, the forwardly projecting flanges forming a channel-way to receive the cross-arm, and the rearwardly projecting flanges lying at right angles thereto and forming projections adapted to enter the substance of the pole, and means to clamp the cross-arm and support to the pole.

Signed by me at Chicago, county of Cook and State of Illinois in the presence of two witnesses.

EDWARD C. SHORT.

Witnesses:
DAVID S. HULFISH,
KEMPSTER B. MILLER.